US006657013B2

(12) United States Patent
Grootaert et al.

(10) Patent No.: US 6,657,013 B2
(45) Date of Patent: Dec. 2, 2003

(54) IMIDATE-CONTAINING FLUOROPOLYMER COMPOSITIONS

(75) Inventors: Werner M. A. Grootaert, Oakdale, MN (US); Robert E. Kolb, Afton, MI (US); Klaus Hintzer, Woodbury, MN (US); Werner Schwertfeger, Bavaria (DE)

(73) Assignee: 3M Innovative Properties Company, St. Paul, MN (US)

( * ) Notice: Subject to any disclaimer, the term of this patent is extended or adjusted under 35 U.S.C. 154(b) by 43 days.

(21) Appl. No.: 09/952,010

(22) Filed: Sep. 11, 2001

(65) Prior Publication Data

US 2002/0061977 A1 May 23, 2002

Related U.S. Application Data

(60) Provisional application No. 60/233,386, filed on Sep. 18, 2000.

(51) Int. Cl.[7] .................. C08L 27/12; C08L 27/18; C08K 3/04
(52) U.S. Cl. .................. 525/326.3; 525/326.4; 525/359.3; 525/374; 525/195; 525/200; 524/424
(58) Field of Search .......... 525/326.3, 326.4, 525/359.3, 374, 195, 200; 524/424

(56) References Cited

U.S. PATENT DOCUMENTS

| 3,523,132 | A | | 8/1970 | Dorfman et al. ............ 260/453 |
|---|---|---|---|---|
| 4,281,092 | A | | 7/1981 | Breazeale .................. 526/247 |
| 4,882,390 | A | | 11/1989 | Kolb ...................... 525/326.3 |
| 5,266,650 | A | | 11/1993 | Guerra et al. ............ 525/326.4 |
| 5,268,405 | A | | 12/1993 | Ojakaar et al. ............. 524/366 |
| 5,285,002 | A | | 2/1994 | Grootaert ................... 526/222 |
| 5,554,680 | A | | 9/1996 | Ojakaar ..................... 524/496 |
| 5,565,512 | A | | 10/1996 | Saito et al. ................. 525/340 |
| 5,621,145 | A | | 4/1997 | Saito et al. ................. 564/229 |
| 5,639,837 | A | | 6/1997 | Farnham et al. ............ 526/222 |
| 5,677,389 | A | | 10/1997 | Logothetis et al. |
| 5,700,879 | A | | 12/1997 | Yamamoto et al. ......... 525/353 |
| 5,767,204 | A | | 6/1998 | Iwa et al. ................... 525/359 |
| 6,221,970 | B1 | * | 4/2001 | Morken et al. ........... 525/326.3 |
| 6,281,296 | B1 | * | 8/2001 | MacLachlan et al. .... 525/326.3 |
| 2002/0026014 | A1 | * | 2/2002 | Bish et al. .................. 525/375 |

FOREIGN PATENT DOCUMENTS

| EP | 0 317 508 A2 | 5/1989 |
|---|---|---|
| EP | 0 335 574 A2 | 10/1989 |

* cited by examiner

Primary Examiner—D. R. Wilson
(74) Attorney, Agent, or Firm—Dean M. Harts; James V. Lilly

(57) ABSTRACT

A composition that includes a fluoropolymer comprising interpolymerized units derived from a cure site monomer comprising a nitrile group; and (b) a catalyst composition comprising a compound having the formula $R^1C(OR^2)=NH$, and salts thereof, where $R^1$ and $R^2$, independently, are a substituted or unsubstituted alkyl, aryl, aralkyl, or alkenyl group, as well as a method for curing this composition and cured articles prepared from this composition.

23 Claims, No Drawings

IMIDATE-CONTAINING FLUOROPOLYMER COMPOSITIONS

CROSS-REFERENCE TO RELATED APPLICATION

This application claims priority from U.S. Ser. No. 60/233,386, filed Sep. 18, 2000.

TECHNICAL FIELD

This invention relates to fluoropolymer compositions having nitrile group-containing cure-site components.

BACKGROUND

Fluorine-containing polymers (also known as "fluoropolymers") are a commercially useful class of materials. Fluoropolymers include, for example, crosslinked fluoroelastomers, and semi-crystalline or amorphous fluoroplastics. Fluoroplastics are generally of high thermal stability and are particularly useful at high temperatures. They may also exhibit extreme toughness and flexibility at very low temperatures. Some have very low dielectric loss and high dielectric strength, and may have unique low friction properties.

Fluoroelastomers exhibit significant tolerance to high temperatures and harsh chemical environments. Consequently, they are particularly useful as seals, gaskets, and other molded parts in systems that are exposed to elevated temperatures and/or corrosive chemicals. Such parts are widely used in the chemical processing, semiconductor, aerospace, and petroleum industries, among others.

Fluoroelastomers often include a cure-site component to facilitate cure in the presence of a catalyst. One class of useful cure-site components includes nitrile group-containing monomers. Organotin catalysts are typically used as cure catalysts. Such catalysts, however, are toxic and can leave undesirable extractable metal residues in the cured product.

SUMMARY

In one aspect, the invention relates to a composition that includes (a) a fluoropolymer having interpolymerized units derived from a cure site monomer comprising a nitrile group; and (b) a catalyst composition that includes a compound having the formula $R^1C(OR^2)=NH$, and salts thereof, where $R^1$ and $R^2$, independently, are a substituted or unsubstituted alkyl, aryl, aralkyl, or alkenyl group. "Substituted" means substituted by substituents that do not interfere with the desired product. Examples of suitable substituents include halogen (e.g., chlorine, fluorine, bromine, iodine), cyano, alkoxy, and carboxy groups. In addition, one or more of the carbon atoms may be substituted by a heteroatom such as oxygen or nitrogen. Specific examples of useful groups for $R^1$ include fluoroalkyl, perfluoroalkyl, and perfluoro (poly)ether groups (e.g., as described in U.S. Pat. No. 5,266,650). Specific examples of useful groups for $R^2$ include fluoroalkyl and perfluoroalkyl groups. In yet another aspect, the invention provides a method for curing this composition, as well as the cured compositions.

The compositions retain the advantages of the use of nitrile group-containing cure site monomers such as the high temperature performance properties and chemical resistance typically achieved when organotin compounds are used as the catalyst system with such cure site monomers. At the same time, the compositions exhibit markedly improved compression set values and eliminate the presence of extractable metal residues resulting from the use of organometal catalysts. In addition, the cured compositions, in some cases, may be optically clear in the absence of carbon black or other colorants. "Optically clear" means that the composition is substantially transparent and does not show severe discoloration.

Because the compositions are free of extractable organometal compounds, they may be characterized as being "clean." This result is achieved without the need to employ any additional processing steps to eliminate the organometal compounds. The compositions are useful in applications where polymer stability (e.g., thermal stability), chemical resistance, and/or optical clarity are important. They are also useful in silicon wafer fabrication.

The details of one or more embodiments of the invention are set forth in the accompanying drawings and the description below. Other features, objects, and advantages of the invention will be apparent from the description and from the claims.

DETAILED DESCRIPTION

Suitable fluoropolymers include interpolymerized units derived from a nitrile group-containing monomer and, preferably, at least two principal monomers. Examples of suitable candidates for the principal monomer include perfluoroolefins (e.g., tetrafluoroethylene and hexafluoropropene), perfluorovinyl ethers (e.g., perfluoroalkyl vinyl ethers and perfluoroalkoxy vinyl ethers), and hydrogen-containing monomers such as olefins (e.g., ethylene, propylene, and the like) and partially-fluorinated olefins such as vinylidene fluoride.

Suitable perfluorinated vinyl ethers include those of the formula:

$$CF_2=CFO(R'_fO)_a(R''_fO)_bR_f \qquad (1)$$

where $R'_f$ and $R''_f$ are the same or are different linear or branched perfluoroalkylene groups of 1–6 carbon atoms; a and b are, independently, 0 or an integer from 1 to 10; and $R_f$ is a perfluoroalkyl group of 1–6 carbon atoms.

A preferred class of perfluoroalkyl vinyl ethers includes compositions of the formula:

$$CF_2=(CFO(CF_2CFXO)_nR_f \qquad (2)$$

wherein X is F or $CF_3$; n is 0–5, and $R_f$ is a perfluoroalkyl group of 1–6 carbon atoms.

Most preferred perfluoroalkyl vinyl ethers are those where, in reference to either Formula 1 or 2 above, n is 0 or 1 and $R_f$ contains 1–3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=(CFO[(CF_2)_m(CFZ)_uO]_nR_f \qquad (3)$$

where $R_f$ is a perfluoroalkyl group having 1–6 carbon atoms, m is 0–2, u is 0 or 1, n is 0–5, provided that both m and n are not zero, and Z is F or $CF_3$. Preferred members of this class are those in which $R_f$ is $CF_3$ or $C_3F_7$, m is 0, and n is 1.

Additional perfluoroalkyl vinyl ether monomers useful in the invention include those of the formula:

$$CF_2=CFO[(CF_2CF(CF_3)O)_g(CF_2)_k(OCF_2)_p]C_xF_{2x+1} \qquad (4)$$

where g is 0 or an integer from 1–5, k is 0 or an integer from 1–6, p is 0–3, and x is 1–5, provided that when k is 0, p is also 0. Preferred members of this class include compounds where g is 0 or 1, k is 0 or 1, p is 0 or 1, and x is 1.

Perfluoroalkoxy vinyl ethers useful in the invention include those of the formula:

$$CF_2=CFO(CF_2)_t(CFZ)_uO(CF_2O)_wC_xF_{2x+1} \quad (5)$$

wherein Z is F or $CF_3$, t is 1–3, u is 0–1, w is 0–3, and x is 1–5, preferably 1. specific, representative, examples of useful perfluoroalkoxy vinyl ethers include $CF_2=CFOCF_2OCF_2CF_2CF_3$, $CF_2=CFOCF_2)OCF_3$, $CF_2=CFO(CF_2)_3OCF_3$, and $CF_2=CFOCF_2CF_2OCF_3$.

Mixtures of perfluoroalkyl vinyl ethers and perfluoroalkoxy vinyl ethers may also be employed.

Perfluoroolefins useful in the invention include those of the formula:

$$CF_2=CF-R^5_f \quad (6)$$

where $R^5_f$ is fluorine or a perfluoroalkyl of 1 to 8, preferably 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention.

One example of a useful fluoropolymer is composed of tetrafluoroethylene and at least one perfluoroalkyl vinyl ether as principal monomer units. In such copolymers, the copolymerized perfluorinated ether units constitute from about 15 to about 50 mole percent (mol %) (more preferably 15 to 35 mol %) of total monomer units present in the polymer.

One or more other fluoropolymers may be incorporated into the fluoropolymer having interpolymerized units derived from a cure site monomer comprising a nitrile group. In addition, one or more other fluoropolymers (which may include one or more copolymers) may be blended with the fluoropolymer (which may comprise a copolymer) having interpolymerized units derived from a cure site monomer comprising a nitrile group. Such other fluoropolymers useful in a blend and/or copolymer include the entire array described above. The other fluoropolymer(s) may lack interpolymerized units derived from a cure site monomer comprising a nitrile group and/or may include reactive sites adapted to a selected curative system. For example, two different fluoropolymers, each having interpolymerized units derived from a cure site monomer comprising a nitrile group may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of nitrile-containing fluoropolymers without the need to include a fluoropolymer lacking nitrile groups.

The fluoropolymers may be prepared by methods known in the art. For example, the polymerization process can be carried out by any free-radical polymerization of the monomers, e.g., in solutions, emulsions, or suspensions in an organic solvent or water. Polymerization in an aqueous emulsion or suspension often is preferred because of the rapid and nearly complete conversion of monomers, easy removal of the heat of polymerization, and ready isolation of the polymer. Emulsion polymerization typically involves polymerizing monomers in an aqueous medium in the presence of a free-radical initiator system, e.g., a persulfate such as ammonium persulfate, potassium permanganate, or organic peroxides, often in the presence of reducing agents and a non-telogenic fluorinated surfactant, such as APFO (ammonium perfluorooctanoate).

Aqueous emulsion polymerization can be carried out continuously under steady-state conditions in which, for example, monomers, water, surfactants, buffers, and catalysts are fed continuously to a stirred reactor under optimum pressure and temperature conditions while the resulting emulsion is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

The free-radical polymerization process can also be carried out in the presence of a perfluorosulfinate and an oxidizing agent to improve the processability of the resulting fluoropolymer composition. Such oxidizing agents are capable of converting the sulfinate to a sulfonyl moiety. The produced sulfonyl radical is believed to eliminate $SO_2$ and form a fluorinated radical that initiates the polymerization of the ethylenically unsaturated monomers. A number of useful oxidizing agents are known as taught in U.S. Pat. No. 5,285,002 and U.S. Pat. No. 5,639,837. Representative examples of such useful oxidizing agents are sodium, potassium, and ammonium persulfates, perphosphates, perborates, percarbonates, bromates, chlorates, and hypochlorites. Other useful oxidizing agents include cerium IV compounds such as $(NH_4)_2Ce(NO_3)_6$. The amount of oxidizing agent used can vary depending on the particular oxidizing agent and sulfinate employed. Typically an equimolar amount or less (based on the amount of sulfinate) is used.

Perfluorosulfinates useful for this purpose include those described in U.S. Pat. No. 5,285,002 and represented by the general formula:

$$R^3_f SO_2 M_{1/x} \quad (7)$$

or $$R^2_f [SO_2 M_{1/x}]_j \quad (8)$$

where $R^3_f$ represents a monovalent fluoroaliphatic radical having, for example, from 1 to 20 carbon atoms, preferably 4 to 10 carbon atoms; $R^2_f$ represents a polyvalent, preferably divalent, fluoroaliphatic radical having, for example, from 1 to 20 carbon atoms, preferably from 2 to 10 carbon atoms; M represents a hydrogen atom or cation with valence x, which is 1 or 2; and j is 1 to 4, preferably 1 or 2.

In addition to the sulfinate, other reducing agents can be present, such as sodium, potassium or ammonium sulfites, bisulfite, metabisulfite, hyposulfite, thiosulfite, phosphite, sodium or potassium formaldehyde sulfoxylate or hypophosphite. Activators such as ferrous, cuprous, and silver salts, may also be present.

The amount of fluoroaliphatic sulfinate employed in the polymerization process can vary, depending, for example, on the molecular weight of polymer desired. Preferably the amount of fluoroaliphatic sulfinate is from 0.001 to 50 mole percent, and most preferably from 0.01 to 10 mole percent, of sulfinate compound based on total quantity of monomers.

The nature and the amount of end groups are not critical to the success in curing the fluoroelastomer. For example, the polymer can contain $SO_3^{(-)}$ end groups generated by an APS/sulfite system, or the polymer may contain $COO^{(-)}$ end groups generated by an APS initiator system or the fluoroelastomer can have "neutral" end groups, e.g., those generated by the use of fluorosulfinate initiator systems or organic peroxides. The number of end groups can be significantly reduced by chain transfer agents of any kind. If desired, such as for improved processing, the presence of strong polar end groups such as $SO_3^{(-)}$ can be minimized and in the case of $COO^{(-)}$ end groups, the amount can be reduced through post treatments (decarboxylation).

The cure site component is capable of curing the fluoropolymer. The cure site component generally will comprise at least one nitrile group-containing cure site monomer. The cure site component can be partially or fully fluorinated. Useful nitrile group-containing cure site monomers include nitrile-containing fluorinated olefins and nitrile-containing fluorinated vinyl ethers, such as depicted below:

  (9)

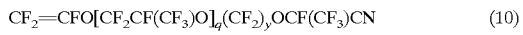  (10)

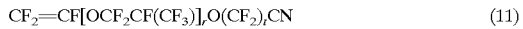  (11)

where, in reference to the above formulas: L=2–12; q=0–4; r=1–2; y=1–6; and t=1–10. Representative examples of such a monomer include perfluoro(8-cyano-5-methyl-3,6-dioxa-1-octene), $CF_2$=$CFO(CF_2)_5CN$, and $CF_2$=$CFO(CF_2)_3OCF(CF_3)CN$.

The fluoropolymer compositions are cured using an imidate catalyst having the formula $R^1C(OR^2)$=NH, and salts thereof, where $R^1$ and $R^2$, independently, are a substituted or unsubstituted alkyl group (e.g., a $C_1$ to $C_{20}$ alkyl group), aryl group (e.g., a phenyl or naphthyl group), aralkyl group (e.g., a tolyl group), or alkenyl group (e.g., a $C_1$ to $C_{20}$ alkenyl group). Examples of suitable substituents include halogen (e.g., chlorine, fluorine, bromine, iodine), cyano, alkoxy, and carboxy groups. In addition, one or more of the carbon atoms may be substituted by a heteroatom such as oxygen or nitrogen. Specific examples of useful groups include fluoroalkyl (e.g., a $C_1$ to $C_{20}$ fluoroalkyl group), perfluoroalkyl (e.g., a $C_1$ to $C_{20}$ perfluoroalkyl group), and perfluoro polyether groups (e.g., as described in U.S. Pat. No. 5,266,650). Preferably, $R^1$ is a perfluoroalkyl group and $R^2$ is a $C_1$ to $C_{10}$ alkyl group.

An example of a useful imidate catalyst is $C_7F_{15}C(OCH_3)$=NH. These imidates may be prepared, for example, by reacting a perfluoroalkylnitrile or perfluroalkyldinitrile with an alcohol, as described in U.S. Pat. No. 3,523,132; ZH. OBS. KHIMI, Vol. 36(5), pages 862–871 (1966); and J. ORG. CHEM., Vol. 30, page 3724 (1965); which are herein incorporated by reference. Examples of commercially available imidates include (a) $CH_3O$—C=NH—$C_4H_8$—C($OCH_3$)=NH (2HCL)(Aldrich Chemical Co.); (b) n—$C_{11}H_{23}$—C($OCH_3$)=NH (HCl) (Maybridge); and (c) $CH_3O$—C=NH—$C_2H_4$—S—S—$C_2H_4C(OCH_3)$=NH (2HCl) (Fluka/ICN/Sigma).

Within the general imidate formula, $R^1C(OR^2)$=NH, preferred $R^2$ groups include $C_1$–$C_{10}$ alkyls, which may be branched, —$CH_2$—$R_f$, —$CH_2CH_2R_f$, wherein $R_f$ is a perfluoro or partially-fluorinated $C_1$–$C_{10}$ group. Preferred $R^1$ groups include $C_4$–$C_{10}$ alkyls. Especially preferred $R^1$ groups include $C_8$ alkyls, $CF_3$—O—$(CF_2)_m$—O—CF($CF_3$)—, wherein m is 1–4, and $C_3F_7$—(—O—CF($CF_3$)—$CF_2)_n$—O—CF($CF_3$)—, wherein n is 0–3.

Compounds having more than one imidate group are also useful, e.g., HN=C($OR^2$)—$(CF_2)_m$—$R^1C(OR^2)$=NH, wherein m is 0–20, preferably 1–9, more preferably 1–5.

The imidates can be used in their salt form, for example, HCl-salt, or a salt of another inorganic acid, or the salt of an organic acid such as carboxylic or sulfonic acid. One specific example of such a salt includes the anion $C_7F_{15}COO^{(-)}$.

In addition, alcohols can be used with the imidate catalysts of the invention. Such alcohols preferably have boiling points of at least 70° C., as do the imidates. Alcohols from ethanol through octanol are preferred. The amount of alcohol used ranges from about 0 to 100 weight percent, relative to the amount of imidate. That is, at 100 weight percent, the weight of alcohol and imidate are equivalent.

The level of imidate units in the overall fluoropolymer composition is that amount sufficient to provide the desired physical properties in a selected material after curing. This level can vary from about 0.05 to 10 parts imidate per 100 parts fluoropolymer (by weight) (phr), more preferably from 0.1 to 5 phr.

The fluoropolymer compositions can be cured using one or more peroxide curatives along with the imidate catalysts. Suitable peroxide curatives generally are those that generate free radicals at curing temperatures. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of fluoropolymer is used.

The fluoropolymer compositions can include any of the adjuvants commonly employed in curable fluoropolymer formulations. For example, one material often blended with a fluoropolymer composition as a part of the peroxide curative system is a coagent (sometimes also referred to as a co-curative) composed of a polyunsaturated compound that is capable of cooperating with the curative to provide a useful cure. These coagents can generally be added in an amount equal to between 0.1 and 10 parts per hundred parts fluoropolymer, preferably between 1 and 5 parts per hundred parts fluoropolymer. Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N', N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate.

Other coagents that can be used with the peroxide curative include the bis-olefins disclosed in EPA 0 661 304A1, EPA 0 784 064 A1 and EPA 0 769 521 A1.

The fluoropolymer compositions can also be cured by combining other types of curatives known to be useful in curing nitrile-containing fluoropolymers along with the integral imidate, if any undesirable features of the known curing system is tolerable. Examples of such curatives include peroxides, aromatic amino compounds including aromatic amino phenols, bis-aminophenols (e.g., as described in U.S. Pat. No. 5,767,204 and U.S. Pat. No. 5,700,879), bis-amidrazones, bis-amidooximes (e.g., as described in U.S. Pat. No. 5,621,145), and ammonium salts (e.g., as described in U.S. Pat. No. 5,565,512). Organometallic compounds of arsenic, antimony and tin also can be used, for example as described in U.S. Pat. Nos. 4,281,092; and 5,554,680. Particular examples include allyl-, propargyl-, triphenylallenyl-, and tetraphenyltin and triphenyltin hydroxide. These additional curatives are preferably added to reach total curative amounts (imidate catalyst plus other curative(s)) from about 0.05 to 10 phr, more preferably 0.1 to 5 phr.

It may be advantageous to add one or more onium salts to the fluoropolymer compositions to obtain improved polymer properties. Examples of suitable onium salts are described in U.S. Pat. No. 4,882,390. Specific examples include triphenylbenzyl phosphonium chloride, tributyl alkyl phosphonium chloride, tributyl benzyl ammonium chloride, tetrabutyl ammonium bromide, and triarylsulfonium chloride. The phosphonium compounds are preferred.

The combination of catalyst, optional imidate(s), and optional curative(s) is generally from about 0.01 to about 10 mol % (more preferably from about 0.1 to about 5 mol %) of the total fluoropolymer amount.

Additives such as carbon black, stabilizers, plasticizers, lubricants, fillers, and processing aids typically utilized in fluoropolymer compounding can be incorporated into the compositions, provided they have adequate stability for the intended service conditions. In particular, low temperature performance can be enhanced by incorporation of perfluoropolyethers. See, for example, U.S. Pat No. 5,268,405.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When used, 1–70 phr of large size particle black is generally sufficient.

Fluoropolymer fillers may also be present in the compositions. Generally, from 1 to 50 parts filler per hundred parts base fluoropolymer resin of one or more fluoropolymer fillers is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer(s). The preferred way to incorporate fluoropolymer filler is by blending latices; this procedure and various kinds of fluoropolymer fillers are described in U.S. Ser. No. 09/495,600, filed Feb. 1, 2000.

Such fillers typically have melting points ranging from 100 to 300° C. Examples of useful fillers include low molecular weight polytetrafluoroethylene (PTFE), tetrafluoroethylene-perfluoropropyl vinyl ether copolymer (PFA), tetrafluoroethylene-hexafluoropropene copolymer (FEP).

One or more acid acceptors can also be added to the formulations, though, where the presence of extractable metallic compounds is undesirable (such as for semiconductor applications) the use of inorganic acid acceptors should be minimized, and preferably avoided altogether. Commonly used acid acceptors include, for example, zinc oxide, calcium hydroxide, calcium carbonate, magnesium oxide, etc. These compounds generally are used in the fluoropolymer formulation to bind any HF or other acids that might be generated at the high temperatures where fluoropolymers must function.

The curable fluoropolymer compositions of the invention may also be combined with other curable fluoropolymer compositions such as peroxide-curable fluoropolymer compositions. These additional curable fluoropolymer compositions typically employ small amounts of cure site monomers as a comonomer. Suitable cure site monomers are those which, when combined with a curative (e.g., a peroxide) and, preferably, a coagent, will provide a cured composition. Preferably these cure site monomers include at least one halo group (e.g., a bromo or an iodo group).

The curable fluoropolymer compositions can be prepared by mixing the fluoropolymer, the imidate catalyst, the selected additive or additives, additional curatives (if any), onium salts (if any), and other adjuvants (if any), in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, for example, by extrusion (for example, in the shape of a hose or hose lining) or molding (for example, in the form of an O-ring seal). The shaped article can then be heated to cure the gum composition and form a cured article.

Pressing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 300° C., typically at about 230° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and is held at this value for about 4 hours or more.

The fluoropolymer compositions are useful in production of articles such as O-rings, gaskets, tubing, and seals. Such articles are produced by molding a compounded formulation of the fluoropolymer composition with various additives under pressure, curing the part, and then subjecting it to a post-cure cycle. The curable compositions formulated without inorganic acid acceptors are particularly useful for applications such as seals and gaskets for manufacturing semiconductor devices, and in seals for high temperature automotive uses.

The invention will now be described further by way of the following examples.

EXAMPLES

Test Methods

In the following examples, indicated results were obtained using the following test methods:

Cure rheology: Cure rheology tests were run on uncured, compounded samples using a Monsanto Moving Die Rheometer (MDR) Model 2000 in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$)

were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Press-Cure: Unless otherwise noted, 150×150×2.0 mm sheets were prepared for physical property determination by pressing at about 6.9 Mega Pascals (M Pa) for 30 minutes at 177° C.

Post-Cure: Press-cured sample sheets were exposed to heat under nitrogen using the following six stages of conditions: 25–200° C. over 6 hours; 200° C. for 16 hours; 200–250° C. over 2 hours; 250° C. for 8 hours; 250–300° C. over 2 hours; and 300° C. for 16 hours. The samples were returned to ambient temperature before testing.

Physical Strength: Tensile Strength at Break, Elongation at Break, and Modulus at 100% Elongation were determined using ASTM D 412-92 on samples cut from the press-cure or post-cure sheet with ASTM Die D. Results were recorded in psi and converted to the reported MPa values.

Heat Aging: Press-cured and post-cured sample sheets were exposed to heat in air for 70 hours at 290° C. and then returned to ambient temperature before testing.

Hardness: Samples were measured using using ASTM D 2240-85 Method A with a Type A-2 Shore Durometer. Units are reported in points on the Shore A scale.

Compression set: O-ring samples were measured using ASTM 395-89 Method B. The O-rings had a cross-section thickness of 0.139 in. (3.5 mm.). Results are reported as a percentage of permanent set.

Example 1

A fluoroelastomer was prepared which contained 62.1 mole percent tetrafluoroethylene, 36.8 mole percent perfluoromethyl vinyl ether, and 1.1 mole percent of a nitrile group-containing cure site monomer, $CF_2=CFO(CF_2)_5CN$, by aqueous emulsion polymerization with APS initiation. The resulting polymer (100 g) was compounded with: 15 g of FEF N550 carbon black, 2.5 g of $C_7F_{15}C(OCH_3)=NH$, and 0.75 g of triphenyl benzyl phosphonium chloride.

Cure rheology tests were run on the uncured, compounded sample. A sheet of the compounded admixture was cured and tested. The results are included in the Tables below.

Examples 2–3

The procedure of Example 1 was followed except that the FEF N550 carbon black was omitted and, in the case of Example 3, the triphenyl benzyl phosphonium chloride was omitted.

Samples were tested as in Example 1 and the results are included in the Tables below. Following heat aging, the sample prepared according to Example 3 was optically clear.

Examples 4–5

The procedure of Examples 2 and 3 was followed except that the elastomer gum was a blend of the polymer used in Examples 2 and 3, and a PFA fluoropolymer filler in a ratio of 80 parts gum:20 parts filler. The catalyst composition consisted of 2.0 g of $C_7F_{15}C(OCH_3)=NH$ and 0.8 g of triphenyl benzyl phosphonium chloride in Example 4. In Example 5, the triphenyl benzyl phosphonium chloride was omitted.

Samples were tested as in Example 1 and the results are included in the Tables below. Following heat aging, the sample prepared according to Example 5 changed from brown to white.

Example 6

A fluoroelastomer was prepared by aqueous emulsion polymerization initiated by APS (ammonium persulfate). The fluoropolymer contained 62.0 mole percent tetrafluoroethylene, 36.8 mole percent perfluoromethyl vinyl ether, and 1.2 mole percent of a nitrile group-containing cure site monomer, $CF_2=CFO(CF_2)_5CN$. The resulting polymer (100 g) was compounded with: 15 g of FEF N550 carbon black, 1.25 g of $C_7F_{15}C(=NH)OC_4H_9$, 1.5 g of triphenyl benzyl phosphonium chloride, 0.8 g Varox DBPH50 2,5-dimethyl-2,5-di-t-butyl peroxy hexane, and 1.5 g TAIC (triallyl isocyanurate).

Samples were tested as above, except the Press Cure was 10 minutes rather than 30. The results are included in the Tables below.

Comparative Example 1 (CE-1)

The procedure of Example 1 was repeated except that 2.0 g of tetraphenyl tin, rather than a mixture of the perfluoroimidate and triphenyl benzyl phosphonium chloride, was used as the cure catalyst. Samples were tested and the results are included in the Tables below.

TABLE 1

| | Cure Rheology | | | | | | |
|---|---|---|---|---|---|---|---|
| | Ex 1 | Ex 2 | Ex 3 | Ex 4 | Ex 5 | Ex 6 | CE-1 |
| $M_L$ (N m) | 0.076 | 0.038 | 0.044 | 0.099 | 0.101 | 0.212 | 0.228 |
| $M_H$ (N m) | 0.773 | 0.569 | 0.395 | 0.688 | 0.476 | 1.255 | 1.773 |
| $t_s2$ (min) | 65 | 8.5 | 4.07 | 7.02 | 4.96 | 1.12 | 0.48 |
| T'50 (min) | 8.77 | 9.61 | 7.71 | 9.92 | 3.53 | 1.78 | 0.76 |
| T'90 (min) | 28.77 | 32.52 | 15.66 | 21.76 | 17.38 | 10.11 | 5.75 |

TABLE 2

| | Press-Cured and Post-Cured | | | | | | |
|---|---|---|---|---|---|---|---|
| | Ex 1 | Ex 2 | Ex 3 | Ex 4 | Ex 5 | Ex 6 | CE-1 |
| Tensile Strength at Break (MPa) | 18.35 | 5.14 | 9.03 | 9.28 | 7.07 | 18.27 | 13.75 |
| Elongation at Break (%) | 150 | 201 | 277 | 203 | 198 | 116 | 144 |
| 100% Modulus (MPa) | 6.87 | 1.28 | 1.17 | 3.28 | 3.12 | 14.62 | 7.39 |
| Shore A Hardness | 70 | 52 | 53 | 64 | 60 | 79 | 72 |

TABLE 3

Compression Set (%)

| | Ex 1 | Ex 2 | Ex 3 | Ex 4 | Ex 5 | Ex 6 | CE-1 |
|---|---|---|---|---|---|---|---|
| 70 h at 200° C. | 9.1 | 6.6 | 17.4 | 1.9 | 34.1 | 16.2 | 59.5 |
| 70 h at 230° C. | 11.5 | 9.3 | 15.3 | 14.6 | 30.9 | 25.8 | 76.6 |
| 22 h at 300° C. | 15.3 | nm | nm | nm | nm | nm | 100 |
| 44 h at 300° C. | 20.6 | nm | nm | nm | nm | nm | nm |
| 70 h at 300° C. | 24.7 | nm | nm | nm | nm | nm | nm |

In Table 3, "nm" indicates that the sample was not measured.

TABLE 4

Heat Aged

| | Ex 1 | Ex 2 | Ex 3 | Ex 4 | Ex 5 | Ex 6 | CE-1 |
|---|---|---|---|---|---|---|---|
| Tensile Strength at Break (MPa) | 14.64 | 6.09 | 9.03 | 11.47 | 9.32 | 16.55 | 11.86 |
| Elongation at Break (%) | 185 | 265 | 352 | 264 | 296 | 202 | 250 |
| 100% Modulus (MPa) | 4.35 | 1.03 | 0.95 | 2.79 | 2.52 | 6.61 | 3.65 |
| Shore A Hardness | 69 | 53 | 53 | 64 | 63 | 77 | 71 |

The results demonstrate that compositions prepared using the imidate cure catalyst exhibit improved properties relative to compositions prepared using an organotin cure catalyst. Most notably, the imidate-cured catalysts exhibited substantially better (lower) compression set values.

A number of embodiments of the invention have been described. Nevertheless, it will be understood that various modifications may be made without departing from the spirit and scope of the invention.

What is claimed is:

1. A composition comprising:
   (a) a fluoropolymer comprising interpolymerized units of a cure site monomer comprising a nitrile group; and
   (b) a catalyst composition comprising a compound having the formula $R^1C(OR^2)=NH$, or a salt thereof, where $R^1$ and $R^2$, independently, are a substituted or unsubstituted alkyl, aryl, aralkyl, or alkenyl group.

2. A composition according to claim 1 wherein said fluoropolymer is selected from a fluoroplastic, a perfluoroplastic, a fluoroelastomer, and a perfluoroelastomer.

3. A composition according to claim 1 wherein said compound has the formula $C_7F_{15}C(OCH_3)=NH$.

4. A composition according to claim 1 wherein $R^1$ is a fluoroalkyl or perfluoroalkyl group.

5. A composition according to claim 1 wherein said fluoropolymer further comprises interpolymerized units of a perfluoro(vinyl ether) selected from a perfluoro(alkyl vinyl ether), and a perfluoro(alkoxyalkyl vinyl ether).

6. A composition according to claim 5 wherein said perfluorovinyl ether is selected from the group consisting of perfluoro(methyl vinyl ether), perfluoro(ethyl vinyl ether), perfluoro(propyl vinyl ether), $CF_2=CFOCF_2OCF_2CF_2OCF_3$, $CF_2=CFO(CF_2)_3OCF_3$, $CF_2CFOCF_2CF_2OCF_3$, and combinations thereof.

7. A composition according to claim 1 wherein said fluoropolymer further comprises interpolymerized units of monomers selected from the group consisting of perfluoroolefins, olefins, vinylidene fluoride, and combinations thereof.

8. A composition according to claim 7 wherein the fluoropolymer comprises interpolymerized units of tetrafluoroethylene.

9. A composition according to claim 1 wherein said cure site component is a nitrile-containing monomer having the formula $CF_2=CFO(CF_2)_LCN$; $CF_2=CFO[CF_2CF(CF_3)O]_q(CF_2)_yOCF(CF_3)CN$; or $CF_2=CF[OCF_2CF(CF_3)]_rO(CF_2)_tCN$ where L=2–12; q=0–4; y=0–6; r=1–2; and t=1–4.

10. A composition according to claim 1 further comprising a fluoropolymer filler selected from the group consisting of polytetrafluoroethylene, tetrafluoroethylene-perfluoropropyl vinyl ether copolymer, tetrafluoroethylene-hexafluoropropene copolymer, and combinations thereof.

11. A composition according to claim 1 further comprising an additional curative, and optionally a coagent.

12. The composition of claim 11 wherein the additional curative is selected from ammonium salts, ammonia-generating compounds, substituted triazine derivatives, unsubstituted triazine derivatives, peroxides, bis-aminophenols, bis-amidrazones, bis-amidooximes, and organo-metallic compounds.

13. The composition of claim 1 further comprising an onium salt, and optionally an alcohol.

14. The composition of claim 13 wherein the onium salt is a phosphonium salt.

15. The composition of claim 1 further comprising one or more other fluoropolymer(s).

16. A composition comprising:
   (a) a fluoroelastomer gum comprising interpolymerized units of (i) a perfluorovinyl ether; (ii) a cure site monomer comprising a nitrile group; and (iii) a monomer selected from the group consisting of perfluroolefins, olefins, vinylidene fluoride, and combinations thereof;
   (b) a catalyst composition comprising a compound having the formula $R^1C(OR^2)=NH$, or a salt thereof, where $R^1$ is a perfluoroalkyl group and $R^2$ is a substituted or unsubstituted alkyl, aryl, aralkyl, or alkenyl group;
   (c) optionally an onium salt; and
   (d) optionally an alcohol.

17. A composition according to claim 16 further comprising a filler selected from a fluoropolymer filler, carbon black, and combinations thereof.

18. A composition according to claim 17 wherein said fluoropolymer filler is selected from the group consisting of polytetrafluoroethylene, tetrafluoroethylene-perfluoropropyl vinyl ether copolymer, tetrafluoroethylene-hexafluoropropene copolymer, and combinations thereof.

19. A method of curing a composition comprising curing a fluoropolymer comprising interpolymerized units of a cure site monomer comprising a nitrile group in the presence of a catalyst composition comprising a compound having the formula $R^1C(OR^2)=NH$, or a salt thereof, where $R^1$ and $R^2$, independently, are a substituted or unsubstituted alkyl, aryl, aralkyl, or alkenyl group.

20. A method according to claim 19 wherein said fluoropolymer is selected from a fluoroplastic, a perfluoroplastic, a fluoroelastomer, and a perfluoroelastomer.

21. A method according to claim 19 wherein $R^1$ is a fluoroalkyl or perfluoroalkyl group.

22. A method according to claim 19 wherein said fluoropolymer further comprises interpolymerized units derived from a perfluorovinyl ether.

23. A method according to claim 19 wherein said fluoropolymer further comprises interpolymerized units of monomers selected from the group consisting of perfluoroolefins, olefins, vinylidene fluoride, and combinations thereof.

* * * * *

UNITED STATES PATENT AND TRADEMARK OFFICE
CERTIFICATE OF CORRECTION

PATENT NO. : 6,657,013 B2
DATED : December 2, 2003
INVENTOR(S) : Grootaert, Werner M. A.

It is certified that error appears in the above-identified patent and that said Letters Patent is hereby corrected as shown below:

Title page,
Item [56], References Cited, U.S PATENT DOCUMENTS, delete "Kolb" and insert -- Grootaert et al. --

Column 2,
Line 44, "$CF_2=(CFO(CF_2CFXO)_nR_f$" should be -- $CF_2=CFO(CF_2CFXO)_nR_f$ --
Line 55, "$CF_2=(CFO[(CF_2)_m(CFZ)_uO]_nR_f$" should be
-- $CF_2=CFO[(CF_2)_m(CFZ)_uO]_nR_f$ --

Column 3,
Line 10, "$CF_2=CFOCF_2)OCF_3$" should be -- $CF_2=CFOCF_2OCF_3$ --

Column 10,
Lines 49-50, Table 1, the word "(min)" should be shown as part of Table 1 included above the line Column 11,
Lines 43 and 52, after "selected from" and insert -- the group consisting of --
Line 59, "$CF_2CFOCF_2CF_2OCF_3$" and insert -- $CF_2=CFOCF_2CF_2OCF_3$ --

Column 12,
Line 43, delete "perfluroolefins" and insert -- perfluoroolefins --
Lines 52 and 67, after "selected from" and insert -- the group consisting of --

Signed and Sealed this

Twenty-seventh Day of April, 2004

JON W. DUDAS
*Acting Director of the United States Patent and Trademark Office*